Oct. 31, 1961  D. M. MacMILLIN  3,006,262
AUTOMATIC EXPOSURE CONTROL PHOTOGRAPHIC CAMERA
Filed May 29, 1959  2 Sheets-Sheet 1
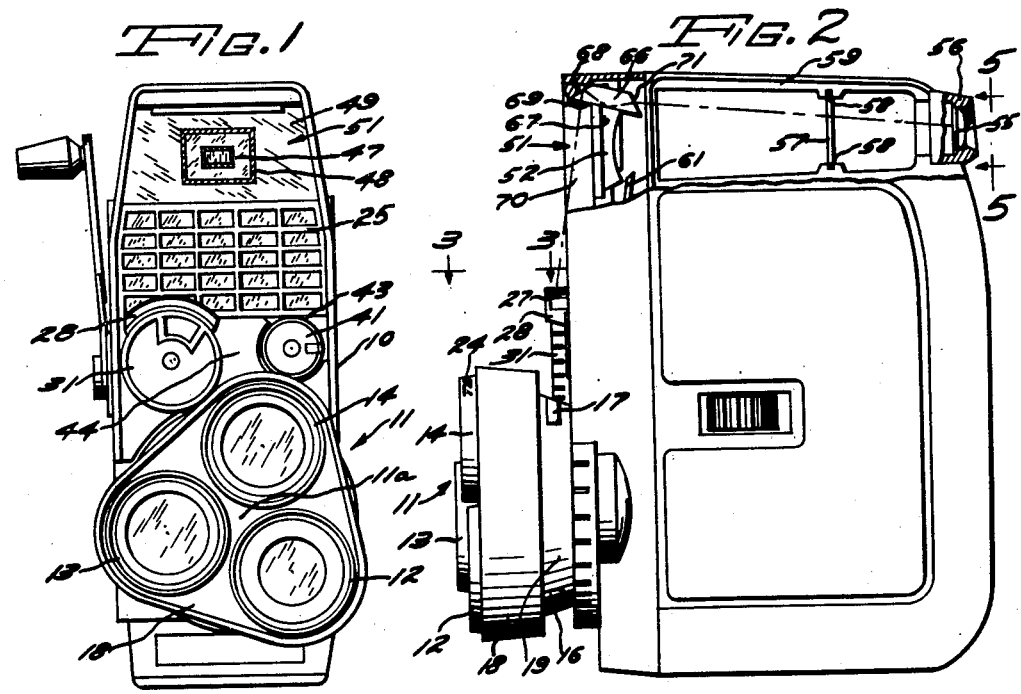
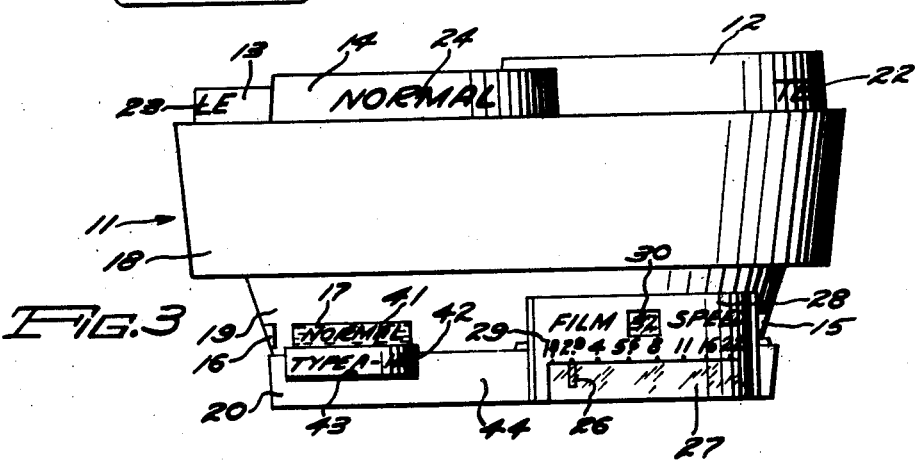
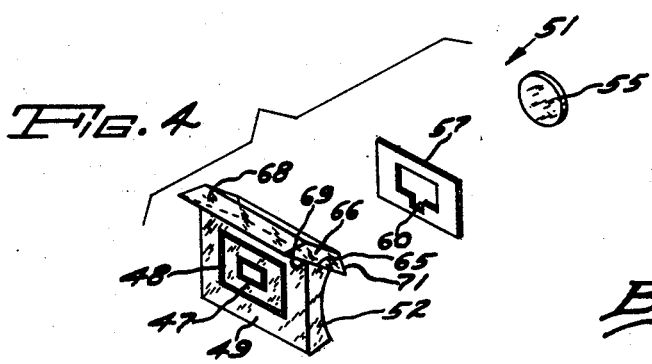
Inventor
David M. MacMillin
By Robert F. Muehle
Atty.

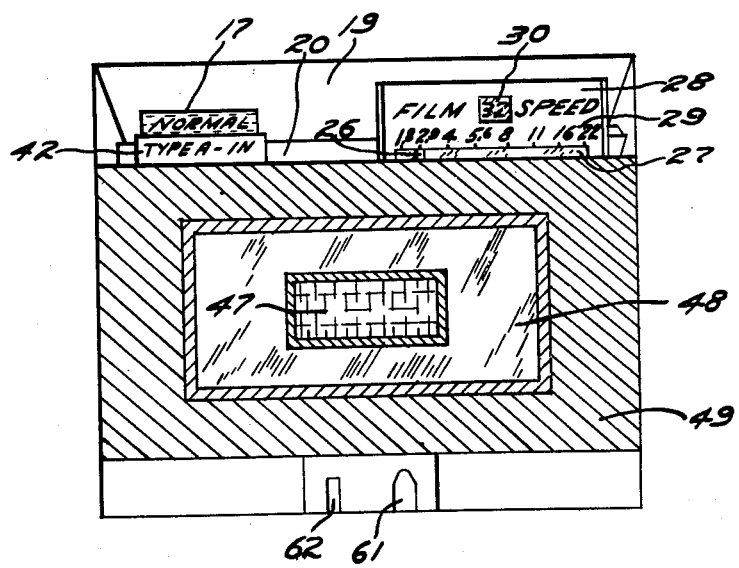

United States Patent Office 3,006,262
Patented Oct. 31, 1961

3,006,262
AUTOMATIC EXPOSURE CONTROL
PHOTOGRAPHIC CAMERA
David M. MacMillin, Wilmette, Ill., assignor to Bell & Howell Company, Chicago, Ill., a corporation of Illinois
Filed May 29, 1959, Ser. No. 816,797
1 Claim. (Cl. 95—44)

This invention relates to an automatic exposure control photographic camera, and more particularly to a viewfinder for a photographic camera having an automatic exposure control device.

An object of the invention is to provide a photographic camera having indicia portions adjustable devices in the field of a light path apparent in the viewfinder of the camera.

Another object of the invention is to provide a camera with a lens turret mounted rotatably on the front of the casing together with a viewfinder having a reflector for directing light from indicia on the turret into the edge portion of the field of view of the viewfinder.

Another object of the invention is to provide a camera having a viewfinder at the top thereof provided with a prism having an overhanging reflecting surface positioned so as to direct to the eye-piece of the viewfinder an image of indicia at the uppermost portion of a lens turret, a film speed indicator, a diaphragm setting indicator and a filter condition indicator, all positioned on the front of the casing of the camera.

In the drawings:

FIG. 1 is a front elevation view of a camera forming one embodiment of the invention;

FIG. 2 is a side elevation view of the camera shown in FIG. 1 with portions thereof broken away to more clearly illustrate the invention;

FIG. 3 is a plan view taken along line 3—3 of FIG. 2;

FIG. 4 is a schematic perspective view of the optical system of the viewfinder of the camera shown in FIG. 1; and FIG. 5 is a view illustrating the view presented at the eye-piece to the observer.

Referring now in detail to the drawings, the motion picture camera shown therein is of the automatic exposure control type such as is disclosed and claimed in Bagby et al. Patents 2,841,064 and 2,858,754 and assigned to the same assignee as the present application. The camera has a casing 10 and a lens turret 11 mounted rotatably on the front of the casing on axis of rotation 11a. The turret is adapted to be manually rotated to selectively position a telephoto lens attachment 12, a wide angle lens attachment 13 and a normal lens shade 14 in the operative or picture taking position in front of and aligned with an optical objective lens or prime lens system in the casing 10. As shown in the drawings, the turret is in a position in which the normal lens attachment 14 is in the picture taking position in alignment with the objective and the aperture of the camera. Corresponding to the elements 12, 13 and 14, there are, on the inner portion 19 of the turret, identifying decalcomanias 15, 16 and 17, respectively, in positions such that when each of the elements 12, 13 and 14 are in the picture taking position the respective indicia 15, 16 and 17 thereof faces upwardly. The turret includes a generally triangular housing 18 including the tapered portion 19 blending to a socket portion 20 of the casing. The elements 12, 13 and 14 also have indicia 22, 23 and 24 thereon with the element 12, 13 or 14 in operative position having its indicia upwardly.

The background of the decalcomania 17 having the legend or indicia "Normal" thereon is of a silver color, the background of the decalcomania 16 having the indicia "Wide angle" thereon is green and that of the decalcomania 15 having the indicia "Telephoto" thereon is gold or yellow. This provides a color code for the lens attachments for a purpose appearing hereinafter.

The camera has a grilled shade 25 on the front of the camera and substantially flush with the front of the casing 10. The shade 25 forms a part of the automatic exposure control device of the camera which is closely similar to that disclosed and claimed in the above mentioned Bagby et al. Patent 2,841,064. The exposure control device includes a needle or pointer 26 (FIG. 3) which is driven by the control device and is in a position corresponding to the adjustment of the stop or diaphragm of the control device. The needle 26 is movable along and positioned under a plastic window 27 supported by an arcuate member or cover 28 fixed to the front face of the casing. The window 27, the member 28 and the pointer 26 all are positioned forwardly of the front face of the casing 10. The member 28 has a stop scale 29 thereon along which the needle moves to indicate the stop adjustment. The member 28 has a second window 30 of transparent plastic with the indicia "Film speed" adjacent thereto. Below the member 28 is a manual adjustment mechanism 31 (FIG. 1) which provides the dual function of a manual override for manually adjusting the diaphragm and a manual adjustment of the automatic exposure control device to selectively adjust it for different film speeds. The position of the needle along the f-stop scale 29 indicates the diaphragm adjustment both during automatic operation of the automatic exposure control device and manual operation thereof, and the mechanism 31 provides indicia visible through the window 30 to indicate the A.S.A. number or speed of the film being used in the camera.

To position a type A filter (not shown) in the optical path of the camera, there is provided a manually adjustable knob 41. The knob also has indicia 42 visible through a cut out or notch 43 in a ledge 44 on the front face of the camera. The ledge 44 is above the knob 41 so that the indicia 41 is visible from above.

A viewfinder 51 of the camera includes an objective lens 52 having a gold or yellow tinted central portion 47, a clear intermediate portion 48 and a green tinted outer portion 49 to indicate telephoto, normal and wide angle fields of view, respectively. This provides a color code to a user with the colors of the decalcomanias 15, 16 and 17, the color of the telephoto decalcomania 15 being the same as that of the telephoto tinted portion 47, that of the wide angle decalcomania being the same as that of the wide angle tinted portion 48 and the color of the normal decalcomania 17 being silver or neutral while that of the normal portion 49 of the lens 52 correspond to one another. An eye-piece 55 is provided in plastic holder 56, and a mask 57 is positioned between the field lens and the eye-piece to minimize reflections. The mask 57 fits in slots 58 in casing 59 of the viewfinder. The mask has a relieved portion or notch 60 in the lower portion thereof to provide a line of sight from the eye-piece 55 to a light pipe 61 which indicates when there is not sufficient illumination for proper exposure, and also provides a line of sight to a member 62 (FIG. 5) which indicates taking up of the film.

The objective lens 52 of the viewfinder has a beveled upper edge 65 to which a prism 66 is cemented, and these elements are secured in grooves 67 in the viewfinder housing 59. The prism has a silvered reflecting surface 68 which overhangs the front face of the camera casing 10 and with bottom inverting, reflecting surface 69 and a sloping refracting surface 71 transmits the image shown in the upper portion of FIG. 5 to the eye-piece so that the lens attachment in operative position, the film speed, the f-stop adjustment of the diaphragm and the presence of or absence of the filter are ascertainable in the view of the user. The casing 10 of the camera has a forwardly projecting rim 70 which physically protects the prism 66 and also provides a decorative appearance to the casing.

While the invention is thus described, it is not wished to be limited to the precise details described, as changes may be readily made without departing from the spirit of the invention.

What is claimed is:

In a camera, a casing, a viewfinder tunnel at the top of the casing, an eye-piece at the rear of the tunnel, a field lens having a beveled upper edge at the front of the tunnel, an annular mask between the field lens and the eye-piece and having a rectangular opening and a notch in the lower portion thereof, an inverting prism cemeted to the upper edge of the field lens and having an upper forward reflecting surface and a bottom reflecting surface along with a rear beveled refracting surface for transmitting an image from the space in front of the front face of the casing to the eye-piece, indicator means visible through the notch, a turret rotatable on the casing and projecting in front of the front face thereof and having indicia facing the upper reflecting surface, an arcuate cover having windows therein projecting from the front of the casing toward one side of and above the turret, rotatable indicia bearing means below the cover, and a rotatable disc having indicia on the periphery mounted rotatably on the front of the casing toward the other side of and above the turret.

References Cited in the file of this patent

UNITED STATES PATENTS

| 2,250,898 | Tonnies | July 29, 1941 |

FOREIGN PATENTS

| 525,255 | Germany | May 21, 1931 |
| 624,597 | Germany | Jan. 24, 1936 |
| 663,099 | Germany | July 29, 1938 |
| 755,177 | Germany | Apr. 27, 1953 |
| 362,621 | Italy | Aug. 31, 1938 |